US012052565B2

(12) United States Patent
Lu et al.

(10) Patent No.: US 12,052,565 B2
(45) Date of Patent: Jul. 30, 2024

(54) SIDELINK SECURITY CONFIGURATION PROCEDURE FOR AVOIDING KEY MISALIGNMENT BETWEEN UE

(71) Applicant: GUANGDONG OPPO MOBILE TELECOMMUNICATIONS CORP., LTD., Guangdong (CN)

(72) Inventors: Qianxi Lu, Guangdong (CN); Zhenshan Zhao, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 276 days.

(21) Appl. No.: 17/564,269

(22) Filed: Dec. 29, 2021

(65) Prior Publication Data
US 2022/0124489 A1   Apr. 21, 2022

Related U.S. Application Data

(63) Continuation of application No. PCT/CN2020/129354, filed on Nov. 17, 2020.
(Continued)

(51) Int. Cl.
*H04W 12/04* (2021.01)
*H04L 69/04* (2022.01)
(Continued)

(52) U.S. Cl.
CPC ............ *H04W 12/04* (2013.01); *H04L 69/04* (2013.01); *H04L 69/322* (2013.01); *H04W 92/18* (2013.01)

(58) Field of Classification Search
CPC .............. H04W 12/04; H04W 92/18; H04W 12/0433; H04W 12/06; H04W 76/14; H04W 76/23; H04L 69/04; H04L 69/322
(Continued)

(56) References Cited

U.S. PATENT DOCUMENTS

2014/0334371 A1*  11/2014  Kim ................. H04W 36/0088
                                                           370/311
2016/0094975 A1   3/2016  Sheng
2017/0086238 A1   3/2017  Lee et al.
(Continued)

FOREIGN PATENT DOCUMENTS

CN      102281535     12/2011
CN      109995461      7/2019
(Continued)

OTHER PUBLICATIONS

Office Action of Europe Counterpart Application No. 20886229.2, issued on Feb. 21, 2023, pp. 1-9.
(Continued)

*Primary Examiner* — Bryan F Wright
(74) *Attorney, Agent, or Firm* — JCIP GLOBAL INC.

(57) ABSTRACT

Embodiments of the disclosure provide user equipment (UE) performing unicast sidelink communication with the second UE and methods therefor. A method of a first UE that performs direct sidelink communication with a second UE includes: receiving a first indication comprising sidelink signalling; in response to receiving the first indication, performing at least one of: updating a configuration for performing a transmission/reception procedure of the first UE in order to update a key based on the updated configuration for performing a transmission/reception procedure; suspending at least one data transmission/reception procedure; and resuming at least one data transmission/reception procedure. Accordingly, the UE may control resumption of transmission/reception on the sidelink such that transmission/reception on the sidelink is only resumed when a key is appropriately updated, thereby avoiding a situation where the UE transmits a message using a key and the second UE attempts to receive said message using a different key.

3 Claims, 8 Drawing Sheets

Related U.S. Application Data

(60) Provisional application No. 62/936,596, filed on Nov. 17, 2019.

(51) Int. Cl.
*H04L 69/322* (2022.01)
*H04W 92/18* (2009.01)

(58) Field of Classification Search
USPC .......................................................... 726/3
See application file for complete search history.

(56) References Cited

U.S. PATENT DOCUMENTS

| | | | |
|---|---|---|---|
| 2018/0070252 A1 | 3/2018 | Gupta et al. | |
| 2018/0199163 A1* | 7/2018 | Chen | ..................... H04W 48/14 |
| 2019/0223008 A1* | 7/2019 | Vanderveen | .......... H04L 9/0825 |

FOREIGN PATENT DOCUMENTS

| | | | | |
|---|---|---|---|---|
| CN | 110140414 | | 8/2019 | |
| EP | 3678450 A1 * | | 7/2020 | ......... H04L 63/0428 |
| WO | WO-2013011191 A1 * | | 1/2013 | ............ H04W 24/10 |
| WO | 2016165124 | | 10/2016 | |
| WO | WO-2021209318 A1 * | | 10/2021 | .......... H04W 12/033 |

OTHER PUBLICATIONS

Samsung, "Introduction of ProSe", 3GPP TSG-RAN2#89 meeting, Feb. 9- 13, 2015, pp. 1-89.
3GPP, "Technical Specification Group Radio Access Network", ATIS 3GPP TR 38.885 V16.0.0, Mar. 2019, pp. 1-123.
UMTS, etal., "Proximity-services (ProSe) User Equipment (UE) to ProSe function protocol aspects ", ETSI TS 124 334 V15.2.0(3GPP TS 24.334 version 15.2.0 Release 15), Oct. 2018, pp. 1-263.
"International Search Report (Form PCT/ISA/210) of PCT/CN2020/129354", mailed on Feb. 20, 2021, pp. 1-4.
"Written Opinion of the International Searching Authority (Form PCT/ISA/237) PCT/CN2020/129354", mailed on Feb. 20, 2021, pp. 1-4.
"Office Action of Europe Counterpart Application, Application No. 20886229.2", issued on Aug. 24, 2023, pp. 1-7.
Office Action of China Counterpart Application, Application No. 202111484382.6, with English translation thereof, issued on Sep. 29, 2023, pp. 1-28.
Office Action of China Counterpart Application, Application No. 202111484382.6, with English translation thereof, issued on Apr. 28, 2023, pp. 1-26.
Office Action of China Counterpart Application, Application No. 202111484382.6, with English translation thereof, issued on Jul. 8, 2023, pp. 1-24.
Interdigital, "TR 33.836 solution #4 update", 3GPP TSG-SA WG3 Meeting #96-Adhoc S3-193307, Oct. 2019, pp. 1-3.
Search report of counterpart Europe application No. 20886229.2, issued on Jun. 9, 2022, pp. 1-10.
3GPP, "3rd Generation Partnership Project; Technical Specification Group Services and System Aspects; Proximity-based Service(prose); Security aspects (Release 15)", 3GPP TS 33.303 V15.0.0, Jun. 2018, pp. 1-90.
3GPP, "3rd Generation Partnership Project; Technical Specification Group Core Network and Terminals; Proximity-services (ProSe) User Equipment (UE) to ProSe function protocol aspects; Stage3 (Release 15)", 3GPP TS 24.334 V15.2.0, Sep. 2018, pp. 1-264.
3GPP, "3rd Generation Partnership Project; Technical Specification Group Radio Access Network; Evolved Universal Terrestrial Radio Access(E-UTRA); Packet Data Convergence Protocol(PDCP) specification(Release 15)", 3GPP TS 36.323 V15.4.0, Jun. 2019, pp. 1-52.
"Office Action of Europe Counterpart Application, Application No. 20886229.2", issued on Feb. 6, 2024, pp. 1-10.

* cited by examiner

SIDELINK SECURITY CONFIGURATION PROCEDURE FOR AVOIDING KEY MISALIGNMENT BETWEEN UE

CROSS-REFERENCE TO RELATED APPLICATIONS

This application is a continuation of international PCT application serial no. PCT/CN2020/129354, filed on Nov. 17, 2020, which claims the priority benefit of U.S. provisional application Ser. No. 62/936,596, filed on Nov. 17, 2019. The entirety of each of the above-mentioned patent applications is hereby incorporated by reference herein and made a part of this specification.

TECHNICAL FIELD

The present invention generally relates to the field of sidelink communication and, more particularly, to rekeying procedures used by user equipments performing unicast sidelink communication. More particularly still, the present invention is directed to a UE that performs unicast sidelink communication with the second UE and methods therefor.

BACKGROUND

With the advent of Internet-of-things (IoT) and modern as well as further generation communication standards and systems, more and more devices are becoming connected to generate and report, convey, share, and/or process data. With regard to the communication systems and paradigms concerned, there is a strong trend for decentralized, local, and independent communication. While most of the established communication systems are based on a more or less hierarchical architecture, in which—for example—a mobile device communicates to a hierarchically upper base station, the trend moves toward flat hierarchical configurations. In such configurations mobile devices, such as mobile phones, devices, sensors, or, generally so-called user equipment (UE), are also allowed to communicate directly to each other, without a necessary involvement of a somewhat hierarchically higher entity, such as a base station, access point, (e)NodeB, and the like.

One field in which devices are increasingly connected to each other involves the field of so-called Vehicle-to-everything (V2X) communication which comprises passing information from a vehicle to any entity that may affect the vehicle, and vice versa. V2X is a vehicular communication system that includes more specific types of communication as Vehicle-to-Infrastructure (V2I), Vehicle-to-vehicle (V2V), Vehicle-to-Pedestrian (V2P), Vehicle-to-device (V2D), or Vehicle-to-grid (V2G). Thereby, most recent V2X communication uses cellular network and was initially defined—amongst others—in Long Term Evolution (LTE) in 3GPP Release 14. It is designed to operate in several modes, like Device-to-device (D2D). In 3GPP Release 15, the V2X functionalities are already expanded to support 5G (eV2X), wherein eV2X refers to the enhancement of V2X which has been facilitated through the provision of 5G (5th generation) technology. Use cases for eV2X include vehicle platooning, automated driving, extended sensors, remote driving, and the like.

V2X communication in combination with cellular network leads to the advantages of support of both direct communications between vehicles (V2V/D2D) and traditional cellular-network based communication and provides migration path to 5G based systems and services.

In conventional cellular traffic, an Evolved Node B (eNB) communicates with the UE via Uplink (UL) and Downlink (DL) for both control signaling and conveying (payload) data. This concept is extended in D2D communication with the introduction of sidelink (SL) transmission and, in particular unicast transmission between two UEs in NR Release 16 (3GPP TR 38.885 V16.0.0 "Study on NR Vehicle-to-Everything (V2X)").

SUMMARY

Technical Problem

In the case of such SL transmission, Proximity-based Services (ProSe) have been developed to allow for direct discovery between two UEs in proximity and direct communication between two UEs over SL channels. In LTE Release 15, security aspects of ProSe features were defined, including the introduction of a rekeying procedure in, for example, 3GPP TS 24.334 V15.2.0 "Proximity-services (ProSe) User Equipment (UE) to ProSe function protocol aspects; Stage 3 (Release 15)". In general, rekeying refers to a process by which one or more keys (e.g. encryption keys) used in communication are updated. In this case, a rekeying procedure is used to refresh the security context (i.e. the security algorithms and keys used to integrity protect and cipher messages transmitted between two UEs) on an established direct link.

FIG. 1 is a schematic illustration summarizing a known process by which rekeying may be achieved, as defined in 3GPP TS 24.334 V15.2.0.

In process step S11 of FIG. 1, a first UE 10 initiates a direct link rekeying procedure in order to refresh the security context by sending a DIRECT_REKEYING_REQUEST message to a second UE 20, the target UE, and starting a timer T4112.

In process step S12 of FIG. 1, if there is no active timer T4112 running, the second UE 20 processes the received DIRECT_REKEYING_REQUEST message and initiates a direct security mode control procedure acting as the commanding UE.

The direct security mode control procedure establishes security association for a direct link between two ProSe-Enabled UEs with the exchange of message contents related to direct security mode establishment and may be performed during a direct link rekeying procedure or during a direct link setup procedure. After successful completion of the direct security mode control procedure, the selected security algorithms and keys are used to integrity protect and cipher messages exchanged between the UEs.

In process step S13, the second UE 20, acting as the commanding UE, sends an unciphered DIRECT SECURITY MODE COMMAND message to the first UE 10, but integrity protects the message with a new security context. After sending the DIRECT_SECURITY_MODE_COMMAND message, the second UE 20 starts timer T4111.

In process step S14, upon receipt of the DIRECT_SECURITY_MODE_COMMAND message, the first UE 10, acting as a peer UE, checks whether the security mode command can be accepted or not. This is done by performing an integrity check of the message and by checking that the received UE security capabilities have not been altered compared to the latest values that the first UE 10 sent to the second UE 20 in the DIRECT_REKEYING_REQUEST message.

In process step S15, if the DIRECT_SECURITY_MODE_COMMAND message can be accepted, the first UE 10 sends a ciphered DIRECT_SECURITY_MODE_COMPLETE message which is integrity protected with the new security context. From this time onward the first UE 10 protects all signalling messages and user data with the new security context.

In process step S16, upon receipt of the DIRECT_SECURITY_MODE_COMPLETE message, the second UE 20 stops timer T4111. From this time onwards the second UE 20 protects all signalling messages and user data with the new security context.

In process step S19, upon completion of the direct security mode control procedure, i.e. upon receiving a DIRECT_SECURITY_MODE_COMPLETE message, the second UE 20 sends a DIRECT_REKEYING_RESPONSE message to notify the first UE 10 of the completion of this direct link rekeying procedure.

In process step S20, upon the reception of a DIRECT_REKEYING_RESPONSE message, the first UE 10 stops timer T4112.

Alternatively, if the DIRECT_SECURITY_MODE_COMMAND message cannot be accepted in process step S14, the first UE 10 sends a DIRECT_SECURITY_MODE_REJECT message in process step S17. Upon receipt of the DIRECT_SECURITY_MODE_REJECT message, in process step S18, the second UE 20 stops timer T4111 and may abort the ongoing procedure that triggered the initiation of the direct security mode control procedure.

The present inventors have recognised that the rekeying procedure of FIG. 1 does not define how to implement the rekeying procedure such that a same key or keys would be used for all bearers between the two UEs at any given time. In particular, in a case where the rekeying is successful, it is still necessary to establish how to change the key simultaneously between for the two UEs, for both transmission and reception. Similarly, in case the rekeying is not successful, it remains to be established how to keep the original key as it is, i.e., avoid misalignment between the two UEs for the key being used, for both transmission and reception.

As such, a problem may occur due to misalignment between the two UEs for the key being used for transmission and reception whereby the first UE 10 transmits a message using a first key and the second UE 20 attempts to receive said message using a different key. This may result in a failure to correctly receive the message and, in turn, a reduction in throughput in unicast SL communication.

Summary of the Solution

The present invention is intended to address one or more of the above technical problems with known rekeying and security configuration procedures.

In particular, in view of the limitations discussed above, the present inventors have devised, in accordance with a first example aspect herein, a method of a first user equipment, UE, that performs direct sidelink communication with a second UE. The method comprises the steps of: receiving a first indication comprising sidelink signalling; in response to receiving the first indication, performing at least one of: updating a configuration for performing a transmission/reception procedure of the first UE in order to update a key based on the updated configuration for performing a transmission/reception procedure; suspending at least one data transmission/reception procedure; and resuming at least one data transmission/reception procedure.

The present inventors have further devised, in accordance with a second example aspect herein, a computer program comprising instructions, which, when executed by a processor of a UE, cause the UE to perform a method according to the first example aspect.

The present inventors have further devised, in accordance with a third example aspect herein, a non-transitory computer-readable storage medium storing a computer program according to the second example aspect.

The present inventors have further devised, in accordance with a fourth example aspect herein, a signal carrying a computer program according to the second example aspect.

The present inventors have further devised, in accordance with a fourth example aspect herein, a UE configured to perform direct sidelink communication with a second UE, wherein the UE is configured to perform a method according to the first example aspect.

Accordingly, the above example aspects may serve to reduce or avoid failure to correctly receive message sent via SL due to rekeying procedures, thereby reducing or avoiding a reduction in throughput in unicast SL communication.

BRIEF DESCRIPTION OF THE DRAWINGS

Embodiments of the invention will now be explained in detail, by way of non-limiting example only, with reference to the accompanying figures, described below. Like reference numerals appearing in different ones of the figures can denote identical or functionally similar elements, unless indicated otherwise.

DETAILED DESCRIPTION

Figure 1:
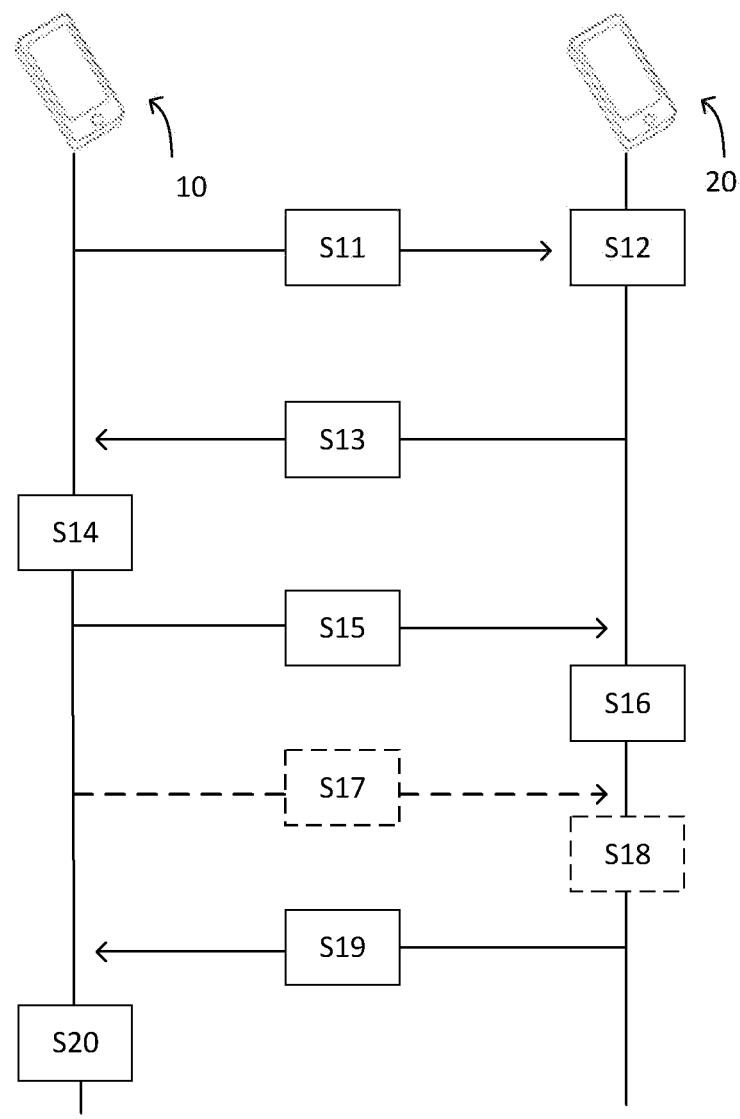
FIG. 1 is a schematic illustration summarizing a known process by which rekeying may be achieved.

Example embodiments of the present invention will now be described in detail with reference to the accompanying drawings.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

Figure 2:
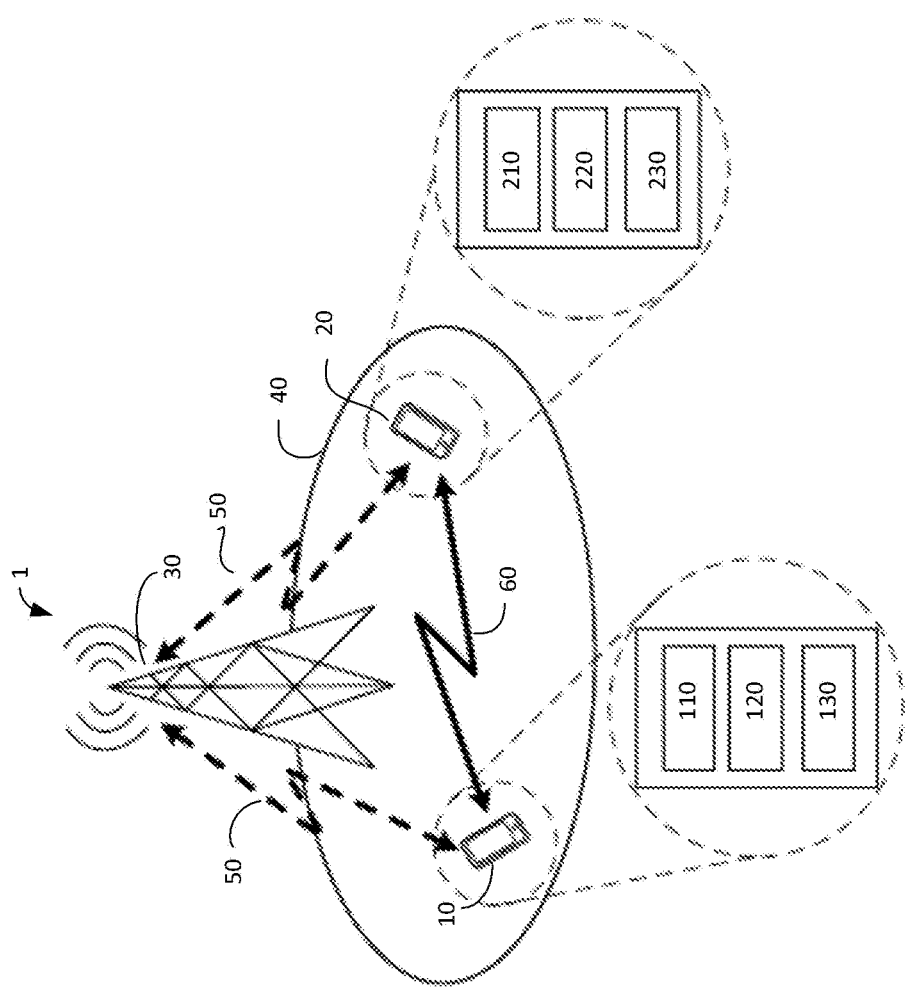
FIG. 2 is a schematic illustration of a radio communication system, according to an example aspect herein.

FIG. 2 is a schematic illustration of radio communications system 1 according to an example aspect herein. The radio communications system 1 comprises a first UE 10, a second UE 20 and radio base station 30. Both the first UE 10 and the second UE 20 may be in radio communication with radio base station 30. Radio base station 30 may, as in the present example, be a 5G gNB (next generation NodeB). Alternatively, the radio base station may be, for example, an LTE-A or LTE eNodeB.

UEs 10, 20 may comprise processing and communication functionalities so as to operate according to one or more of the conventional telecommunication standards, including— but not limited to—GSM, PCS, 3GPP, LTE, LTE-A, UMTS, 3G, 4G, 5G. By way of example, UE 10 may, as in the present example, comprise a control section 110, a transmitting/receiving section 120 and a memory 130. Similarly, UE 20 may, as in the present example, comprise a control section 210, a transmitting/receiving section 220 and a memory 230.

Radio base station 30 is configured to provide access to a radio communications network for UEs 10, 20 in cell 40, for example via beamforming. In the example shown in FIG. 2, the radio base station 30 serves two UEs 10, 20 only. However, in alternative examples, the radio base station 30 may provide service to three or more UEs.

UEs 10, 20 may, as in the present example, be configured to transmit data and/or uplink control information (UCI) to the radio base station 30 via the UL and to receive data and/or downlink control information via the DL. The UL and DL between each UE 10, 20 and the radio base station 30 are indicated by reference sign 50 in FIG. 2. By way of example, either of UEs 10, 20 may transmit data and/or UCI on an uplink shared channel (e.g. PUSCH) and/or to transmit UCI to the radio base station 30 on an uplink control channel (e.g. PUCCH) and/or to receive information transmitted by the radio base station 30 on downlink channels (e.g. PDSCH, PDCCH, PBCH, etc.).

In addition, the first UE 10 and the second UE 20 may communicate directly using unicast SL communication, i.e. perform direct sidelink communication. The sidelink between the first UE 10 and the second UE 20 is indicated by reference sign 60 in FIG. 2.

The air interface between the first and second UEs 10, 20 may be referred to as the PC5 interface and the UEs 10, 20 may, as in the present example, be configured to communicate over the PC5 interface using the ProSe Direct Communication feature, as described in 3GPP TS 24.334 V15.2.0.

The SL between UEs 10, 20 may be established by any suitable means. By way of example, the SL between UEs 10, 20 may be established using the ProSe Direct Discovery feature, as described in 3GPP TS 24.334 V15.2.0.

UEs 10, 20 may, as in the present example, be configured to transmit and receive data and/or control information on a sidelink shared channel (e.g. PSSCH) and/or to transmit and receive control information on a sidelink control channel (e.g. PSCCH). Additionally or alternatively, UEs 10, 20 may be configured to communicate via the sidelink using any other sidelink channel (e.g. PSBCH). Resources assigned to the SL may, for example, be taken from the UL, i.e. from the subframes on the UL frequency in Frequency Division Duplex (FDD) or in Time Division Duplex (TDD).

Figure 3C:
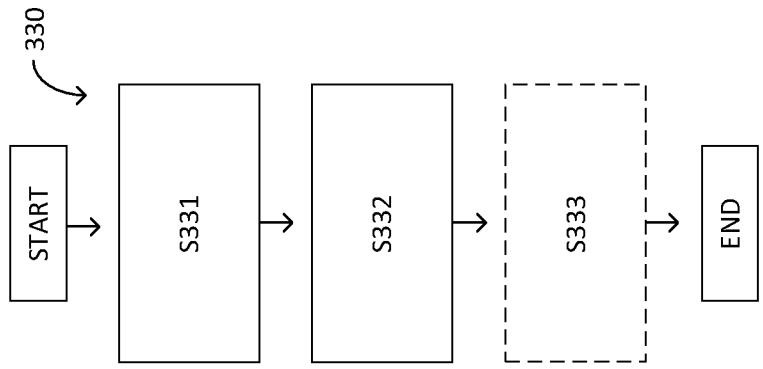
FIG. 3C is a flow diagram illustrating a process by which a UE may perform direct sidelink communication, according to a third example aspect herein.
Figure 3B:
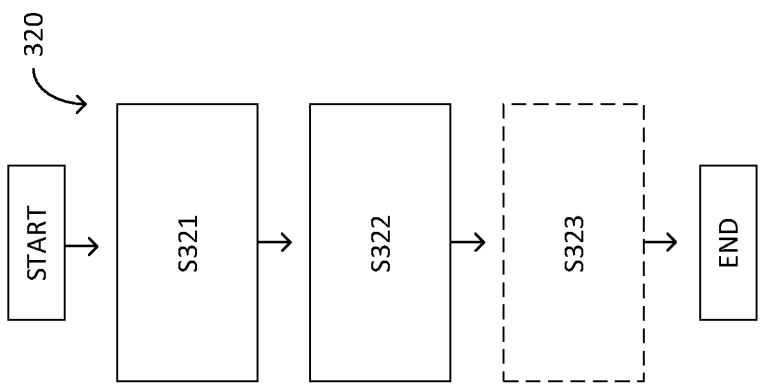
FIG. 3B is a flow diagram illustrating a process by which a UE may perform direct sidelink communication, according to a second example aspect herein.
Figure 3A:
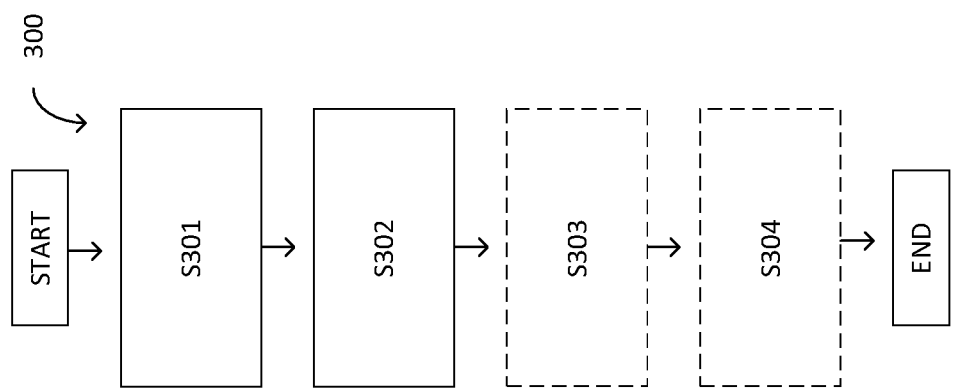
FIG. 3A is a flow diagram illustrating a process by which a UE may perform direct sidelink communication, according to a first example aspect herein.

FIG. 3A is a flow diagram illustrating a process 300 by which a UE may perform direct sidelink communication, according to a first example aspect herein. Optional process steps are indicated by dashed lines in FIG. 3A.

The process 300 is described herein as being performed by UE 10 of FIG. 2. Additionally or alternatively, UE 20 of FIG. 2 may be configured to perform the process 300 of FIG. 3A.

In process step S301 of FIG. 3A, the UE 10 receives a first indication comprising sidelink signalling. The first indication may comprise any suitable message, signalling, notification, whether internal or received from an external entity by wired or wireless communication.

By way of example, the first indication may comprise an internal indication from an upper layer. In this case, receiving the first indication by UE 10 comprises reception by one layer in the protocol stack from another higher layer in the protocol stack.

The internal indication from an upper layer may be a request or any other suitable form of signalling.

The first indication may comprise sidelink signalling in that the first indication is configured to effect or initiate sidelink communication by a lower layer. For example, the first indication may comprise an internal indication configured to effect or initiate transmission of PC5-S signaling, e.g., a DIRECT_REKEYING_REQUEST, a DIRECT SECURITY MODE COMMAND. That is, the first indication may comprise an upper layer internal indication configured to effect or initiate transmission of PC5-S signaling by a lower layer.

By way of alternative, receiving the first indication may comprise the transmitting/receiving section 120 of UE 10 receiving the first indication from a second UE (e.g. UE 20 of FIG. 2) via direct sidelink communication. For example, the first indication may be received over the PC5 interface.

In this case, the sidelink signalling may comprise signalling transmitted via the sidelink. For example, the first indication may comprise at least one of at least one of the following:
- PC5-S signaling, e.g., DIRECT_REKEYING_REQUEST, DIRECT SECURITY MODE COMMAND, DIRECT_SECURITY_MODE_COMPLETE DIRECT_REKEYING_RESPONSE;
- PC5-RRC signaling, e.g., RRCReconfigurationSidelink, RRCReconfigurationCompleteSidelink;
- User plane indication, e.g., control protocol data units (PDU) of Service Data Adaptation Protocol (SDAP), packet data convergence protocol (PDCP) or radio link control (RLC), or medium access control (MAC) control element (CE).

By way of example, a PDCP user plane indication may comprise a PDCP entity reestablishment request.

In process step S302 of FIG. 3A, in response to receiving the first indication, the UE 10 updates a configuration for performing a transmission/reception procedure of the UE 10 in order to update a key based on the updated configuration for performing a transmission/reception procedure.

The UE 10 may update the configuration for performing a transmission/reception procedure of the UE 10 in response to receiving the first indication in that the updating step is subsequent to and dependent on reception of the first indication. The control section 110 of UE 10 may be configured to perform process step S302.

The data transmission/reception procedure may, for example, comprise any process, procedure or mechanism performed by the UE 10 at any layer of the protocol stack that allows the UE 10 to perform unicast sidelink communication with another UE (e.g. UE 20 of FIG. 2). In particular, the data transmission/reception procedure may, for example, allow the UE 10 to transmit and/or receive data using direct sidelink communication.

By way of example, updating the configuration for performing a transmission/reception procedure of the UE 10 by the control unit 110 of UE 10 may, as in the present example, comprise at least one of:
- performing at least one action at a packet data convergence protocol, PDCP, layer including at least one of re-establishment, use of a new key, a compression protocol reset, and a reset of the variables;
- any one of radio link control, RLC, re-establishment, release, and add;
- change of logical channel identifier, LCID;
- full configuration;
- release and/or add of bearers; and
- medium access control, MAC, reset.

More generally, updating the configuration for performing a transmission/reception procedure of the UE 10 in order to update a key based on the updated configuration for performing a transmission/reception procedure may comprise receiving a new key from an upper layer (e.g. an encryption key) and/or using a new key.

Additionally or alternatively, updating the configuration for performing a transmission/reception procedure of the UE 10 in order to update a key based on the updated configuration for performing a transmission/reception procedure may comprise the UE actively determining to update the key in response to the configuration for performing a transmission/reception procedure being updated. Alternatively, the key may be updated automatically in response to the updating of the configuration for performing a transmission/reception procedure of the UE 10 and/or updated by an upper layer.

For example, updating the configuration for performing a transmission/reception procedure of the UE 10 by the control unit 110 may, as in the present example, comprise updating at least one aspect (e.g. a parameter) of the configuration of the UE 10 that affects how the UE 10 performs sidelink communication. This in turn may result in one or more parameters, on which a key (e.g. an encryption key) generation for sidelink communication are based, being updated thereby causing an update of a key used for sidelink communication.

By way of example, the key may, as in the present embodiment, be a key for use data encryption for unicast sidelink communication. The UE 10 may, as in the present example, be configured to use one or more key derivation functions at least once in order to generate the key. For example, the one or more key derivation functions may, for example, comprise any suitable cryptographic hash function, such as SHA-2 or SHA-3 or message authentication code (MAC) algorithm (e.g. HMAC-SHA256 or HMAC-SHA3-256).

Each key derivation function may, as in the present example, comprise one or more input parameters. The one or more input parameters may be based on the configuration for performing a transmission/reception procedure of the UE 10. By way of example, the one or more input parameters may comprise at least one value, such as a logical channel identifier (LCID) that identifies a PDCP instance, a PDCP internal counter (PDCP-SN), etc. In this case, updating the configuration for performing a transmission/reception procedure of the UE 10 by the control unit 110 may comprise directly updating the at least one value or performing a reconfiguration (e.g. PDCP or RLC re-establishment, MAC reset, or any of the examples discussed above) that results in a change of the at least one value.

By updating the at least one value, the one or more input parameters of the one or more key derivation functions may be updated.

Updating a key based on the updated configuration for performing a transmission/reception procedure by the UE 10 may, as in the present example, comprise, generating a key using the one or more key derivation functions at least once based on the updated one or more input parameters.

By way of further example, the UE 10 may update the configuration for performing a transmission/reception procedure of the UE 10 in order to update a key based on the updated configuration for performing a transmission/reception procedure by performing PDCP re-establishment of a PDCP entity (i.e. PDCP re-establishment). For example, the UE 10 may perform PDCP re-establishment of a PDCP entity of the SL via which the first indication was received from the second UE 20 (e.g a PDCP entity of the PC5 interface). In this case, the second indication may comprise, for example, a PDCP user plane indication such as a PDCP entity reestablishment request.

Performing PDCP re-establishment of the PDCP entity may, by way of example, comprise at least one of using a new key, receiving a new key from an upper layer, resetting a compression protocol (e.g. RObust Header Compression ROHC protocol) and resetting a value of one or more variables.

Process 300 of FIG. 3A may optionally further include process step S303. In process step S303, UE 10 transmits a second indication to the second UE (e.g. UE 20 of FIG. 2). The transmitting/receiving section 120 of UE 10 may, as in the present example, be configured to transmit the second indication to the second UE.

Optional process step S303 may, as in the present example, be performed prior to process step S302 and the second indication may comprise information indicating that the configuration for performing a transmission/reception procedure of the UE 10 and/or the key is being or is to be updated. Alternatively, optional process step S303 may be performed subsequently and in response to process step S302 and the second indication may comprise information indicating that the configuration for performing a transmission/reception procedure of the UE 10 and/or the key has been updated.

By way of example, the second indication may comprise at least one of the following:
- PC5-S signaling, e.g., DIRECT_REKEYING_REQUEST, DIRECT SECURITY MODE COMMAND, DIRECT_SECURITY_MODE_COMPLETE DIRECT_REKEYING_RESPONSE;
- PC5-RRC signaling, e.g., RRCReconfigurationSidelink, RRCReconfigurationCompleteSidelink;
- User plane indication, e.g., control PDU of SDAP, PDCP, or RLC, or MAC CE.

In a case where, process step S303 is performed prior to process step S302 and the second indication comprises information indicating that the configuration for performing a transmission/reception procedure of the UE 10 and/or the key is being or is to be updated, the second UE may update the key at its end or perform any other activity related to a rekeying procedure in response to receiving the second indication. This may include, for example, the second UE transmitting a third indication to the UE 10. By way of example, the third indication may include information indicating that the key has been updated by the second UE. In this case, process step S302 may be performed subsequently and in response to receiving such a third indication from the second UE.

Additionally or alternatively, process 300 of FIG. 3A may optionally further include process step S304. In process step S304, the UE 10 may perform transmission and/or reception with the second UE using the updated key in a case where the key is successfully updated.

Alternatively, in process step S304, the UE 10 may perform transmission and/or reception with the second UE using a previously configured key in a case where the key is not successfully updated.

As noted above, when conventional rekeying procedures are used, a problem may occur due to misalignment between the two UEs for the key being used for transmission and reception whereby the first UE 10 transmits a message using a first key and the second UE 20 attempts to receive said message using a different key. This may result in a failure to correctly receive the message and, in turn, a reduction in throughput in unicast SL communication.

By updating a configuration for performing a transmission/reception procedure of the UE 10 in order to update a key based on the updated configuration for performing a transmission/reception procedure in response to receiving a first indication comprising sidelink signalling, it becomes possible to ensure that updating of the key is synchronized with transmission or reception via the sidelink by the UE 10. That is, the key may be appropriately updated when first indication comprising sidelink signalling is received such that any transmission or reception to be performed via the sidelink in response to the reception of the first indication may be performed using the appropriately updated key.

Therefore, the process 300 of FIG. 3A may help to ensure that transmission and reception via the sidelink use the appropriate key.

FIG. 3B is a flow diagram illustrating a process 320 by which a UE may perform direct sidelink communication, according to a second example aspect herein. Optional process steps are indicated by dashed lines in FIG. 3B.

The process 320 is described herein as being performed by UE 10 of FIG. 2. Additionally or alternatively, UE 20 of FIG. 2 may be configured to perform the process 320 of FIG. 3B.

In process step S321 of FIG. 3B, the UE 10 receives a first indication comprising sidelink signalling. Process step S321 of FIG. 3B corresponds to process step S301 of FIG. 3A and, as such, the above description of process step S301 of FIG. 3A applies equally to process step S321 of FIG. 3B.

In process step S322 of FIG. 3B, the UE 10 suspends at least one data transmission/reception procedure in response to receiving the first indication. For example, the control unit 110 of UE 10 may be configured to suspend the at least one data transmission/reception procedure.

The UE 10 may suspend the at least one data transmission/reception procedure in response to receiving the first indication in that the suspending step is subsequent to and dependent on reception of the first indication.

The at least one data transmission/reception procedure may, for example, comprise any process, procedure or mechanism performed by the UE 10 at any layer of the protocol stack that allows the UE 10 to perform unicast sidelink communication with another UE (e.g. UE 20 of FIG. 2). In particular, the at least one data transmission/reception procedure may, for example, allow the UE 10 to transmit and/or receive data using direct sidelink communication.

In this case, by suspending the at least one data transmission/reception procedure, the UE 10 may be prevented from transmitting and/or receiving data using direct sidelink communication. As such, suspending the at least one data transmission/reception procedure may alternatively be referred to as suspending the data.

By way of example, suspending the at least one data transmission/reception procedure may, as in the present example, comprise at least one of the following:
  suspending a bearer, a packet data convergence protocol (PDCP) entity and/or a radio link control (RLC) entity; and
  suspending transmission and/or reception.

Process 320 of FIG. 3B may optionally further include process step S323. In process step S323, UE 10 transmits a second indication to the second UE (e.g. UE 20 of FIG. 2). The transmitting/receiving section 120 of UE 10 may, as in the present example, be configured to transmit the second indication to the second UE.

Optional process step S323 may, as in the present example, be performed prior to process step S322 and the second indication may, for example, comprise information indicating that the at least one data transmission/reception procedure is being or is to be suspended, information configured to initiate a rekeying procedure, and/or information relating to a rekeying procedure. Alternatively, optional process step S323 may be performed subsequently and in response to process step S322 and the second indication may, for example, comprise information indicating that the at least one data transmission/reception procedure has been suspended, information configured to initiate a rekeying procedure, and/or information relating to a rekeying procedure.

By way of example, the second indication may comprise at least one of the following:
  PC5-S signaling, e.g., DIRECT_REKEYING_REQUEST, DIRECT SECURITY MODE COMMAND, DIRECT_SECURITY_MODE_COMPLETE DIRECT_REKEYING_RESPONSE;
  PC5-RRC signaling, e.g., RRCReconfigurationSidelink, RRCReconfigurationCompleteSidelink;
  User plane indication, e.g., control PDU of SDAP, PDCP, or RLC, or MAC CE.

As noted above, when conventional rekeying procedures are used, a problem may occur due to misalignment between the two UEs for the key being used for transmission and reception whereby the first UE 10 transmits a message using a first key and the second UE 20 attempts to receive said message using a different key. This may result in a failure to correctly receive the message and, in turn, a reduction in throughput in unicast SL communication.

By suspending the at least one data transmission/reception procedure in response to receiving a first indication comprising sidelink signalling, it becomes possible to ensure that transmission or reception on the sidelink by the UE 10 is not performed. This may be advantageous in cases where the UE cannot determine whether a second UE (e.g. UE 20) with which unicast sidelink communication is performed has appropriately updated a key. Accordingly, a situation may be avoided in which the first UE 10 transmits a message using a first key and the second UE attempts to receive said message using a different key.

Therefore, the process 320 of FIG. 3B may help to reduce failure to correctly receive the message in direct sidelink communication.

FIG. 3C is a flow diagram illustrating a process 330 by which a UE may perform direct sidelink communication, according to a third example aspect herein. Optional process steps are indicated by dashed lines in FIG. 3B.

The process 330 is described herein as being performed by UE 10 of FIG. 2. Additionally or alternatively, UE 20 of FIG. 2 may be configured to perform the process 330 of FIG. 3C.

In process step S331 of FIG. 3C, the UE 10 receives a first indication comprising sidelink signalling. Process step S331 of FIG. 3C corresponds to process step S301 of FIG. 3A and process step S321 of FIG. 3B and, as such, the above description of process step S301 of FIG. 3A applies equally to process step S331 of FIG. 3C.

In process step S332 of FIG. 3C, UE 10 resumes at least one data transmission/reception procedure in response to receiving the first indication.

The UE 10 may resume the at least one data transmission/reception procedure in response to receiving the first indication in that the resuming step is subsequent to and dependent on reception of the first indication. For example, the control unit 110 of UE 10 may be configured to resume the at least one data transmission/reception procedure.

The at least one data transmission/reception procedure may, as in the present example, comprise any process, procedure or mechanism performed by the UE 10 at any layer of the protocol stack that allows the UE 10 to perform unicast sidelink communication with another UE (e.g. UE 20 of FIG. 2) and that has been previously suspended. In particular, the at least one data transmission/reception procedure may, for example, allow the UE 10 to transmit and/or receive data using direct sidelink communication.

In this case, by resuming the at least one data transmission/reception procedure, the UE 10 may be enabled to resume transmitting and/or receiving data using direct sidelink communication. As such, resuming the at least one data transmission/reception procedure may alternatively be referred to as resuming the transmission.

By way of example, resuming the at least one data transmission/reception procedure may, as in the present example, comprise at least one of:
  resuming a bearer, a packet data convergence protocol (PDCP) entity and/or a radio link control (RLC) entity; and
  performing at least one PDCP layer action comprising at least one of: re-establishment, changing a key, compression protocol reset, and re-transmission of data which has not been acknowledged.

Process 330 of FIG. 3C may optionally further include process step S333. In process step S333, UE 10 transmits a second indication to the second UE (e.g. UE 20 of FIG. 2). The transmitting/receiving section 120 of UE 10 may, as in the present example, be configured to transmit the second indication to the second UE.

Optional process step S333 may, as in the present example, be performed prior to process step S332 and the second indication may, for example, comprise information indicating that the at least one data transmission/reception procedure is being or is to be resumed, information configured to initiate a rekeying procedure, and/or information relating to a rekeying procedure. Alternatively, optional process step S333 may be performed subsequently and in response to process step S332 and the second indication may, for example, comprise information indicating that the at least one data transmission/reception procedure has been resumed, information configured to initiate a rekeying procedure, and/or information relating to a rekeying procedure.

By way of example, the second indication may comprise at least one of the following:
  PC5-S signaling, e.g., DIRECT_REKEYING_REQUEST, DIRECT SECURITY MODE COMMAND, DIRECT_SECURITY_MODE_COMPLETE DIRECT_REKEYING_RESPONSE;
  PC5-RRC signaling, e.g., RRCReconfigurationSidelink, RRCReconfigurationCompleteSidelink;
  User plane indication, e.g., control PDU of SDAP, PDCP, or RLC, or MAC CE.

In a case where, process step S333 is performed prior to process step S332, the second UE may update the key at its end or perform any other activity related to a rekeying procedure in response to receiving the second indication. This may include, for example, the second UE transmitting a third indication to the UE 10. By way of example, the third indication may include information indicating that the key has been updated by the second UE. In this case, process step S332 may be performed subsequently and in response to receiving such a third indication from the second UE.

As noted above, when conventional rekeying procedures are used, a problem may occur due to misalignment between the two UEs for the key being used for transmission and reception whereby the first UE 10 transmits a message using a first key and the second UE 20 attempts to receive said message using a different key. This may result in a failure to correctly receive the message and, in turn, a reduction in throughput in unicast SL communication.

By resuming the at least one data transmission/reception procedure in response to receiving a first indication comprising sidelink signalling, it becomes possible for the UE 10 to selectively perform transmission or reception on the sidelink. This may be advantageous in cases where the UE has previously suspended at least one data transmission/reception procedure and determines that a second UE (e.g. UE 20) with which unicast sidelink communication is performed has appropriately updated a key.

Accordingly, the UE 10 may control resumption of transmission or reception on the sidelink such that transmission or reception on the sidelink is only resumed, for example, when a key is appropriately updated, thereby avoiding a situation in which the first UE 10 transmits a message using a first key and the second UE attempts to receive said message using a different key.

Therefore, the process 330 of FIG. 3C may help to reduce failure to correctly receive the message in direct sidelink communication.

Additionally, the steps of any of process 300 of FIG. 3A, process 320 of FIG. 3B and process 330 of FIG. 3C may be combined in order to achieve further advantages.

By way of example, process 300 of FIG. 3A may be modified to additionally include suspending, by the UE 10, at least one data transmission/reception procedure in response to receiving the first indication as described in relation to process step S322 of FIG. 3B.

The suspending step may be performed prior to process step S302 of FIG. 3A. In this way, it may be advantageously ensured that the at least one data transmission/reception procedure is suspended while the key is being updated. In this way, misalignment between the two UEs for the key being used for transmission and reception whereby the first UE 10 transmits a message using a first key and the second UE 20 attempts to receive said message using a different key may be reduced or avoided.

By way of alternative, in a case where optional process step S303 of process 300 of FIG. 3A is performed prior to process step S302 of process 300, the suspending step may be performed prior to process step S303. In this case, it may be advantageously ensured that the at least one data transmission/reception procedure is suspended before the second UE (e.g. UE 20 of FIG. 2) is notified that the configuration for performing a transmission/reception procedure of the UE 10 and/or the key is being or is to be updated. As such, it can be avoided that data is transmitted to or received from the second UE while the second UE updates the key at its end or performs any other activity related to a rekeying procedure in response to receiving the second indication. In this way, misalignment between the two UEs for the key being used for transmission and reception whereby the first UE 10 transmits a message using a first key and the second UE 20 attempts to receive said message using a different key may be reduced or avoided.

Alternatively, the suspending step may be performed subsequently to process step S302 of FIG. 3A. In this way, it may be advantageously ensured that, once the key is updated, the at least one data transmission/reception procedure is suspended until a corresponding update of the key takes place in the second UE. In this way, misalignment between the two UEs for the key being used for transmission and reception whereby the first UE 10 transmits a message using a first key and the second UE 20 attempts to receive said message using a different key may be reduced or avoided.

Additionally or alternatively, process 300 of FIG. 3A may be modified to include resuming, by the UE 10, at least one data transmission/reception procedure as described in relation to process step S332 of FIG. 3C.

The resuming step may be performed subsequently to process step S302 of FIG. 3A. In this way, it may be advantageously ensured that the at least one data transmission/reception procedure is only resumed after the key has been successfully updated.

By way of alternative, in a case where optional process step S303 of process 300 of FIG. 3A is performed subsequently to process step S302 of process 300 and a third indication is received in response from the second UE, the resuming step may be performed subsequently to receiving said third indication. In this case, it may be advantageously ensured that the at least one data transmission/reception procedure is only resumed after a corresponding successful update of the key has been performed by the second UE (e.g. UE 20 of FIG. 2). In this way, misalignment between the two UEs for the key being used for transmission and reception whereby the first UE 10 transmits a message using a first key and the second UE 20 attempts to receive said message using a different key may be reduced or avoided.

Similarly, in a case where optional process step S303 of process 300 of FIG. 3A is performed prior to process step S302 of process 300 and a third indication is received in response from the second UE, the resuming step may be performed subsequently to receiving said third indication and process step S302. In this case, it may be advantageously ensured that the at least one data transmission/reception procedure is only resumed after a successful update of the key has been first performed by the second UE (e.g. UE 20 of FIG. 2). In this way, misalignment between the two UEs for the key being used for transmission and reception whereby the first UE 10 transmits a message using a first key and the second UE 20 attempts to receive said message using a different key may be reduced or avoided.

Figure 4:
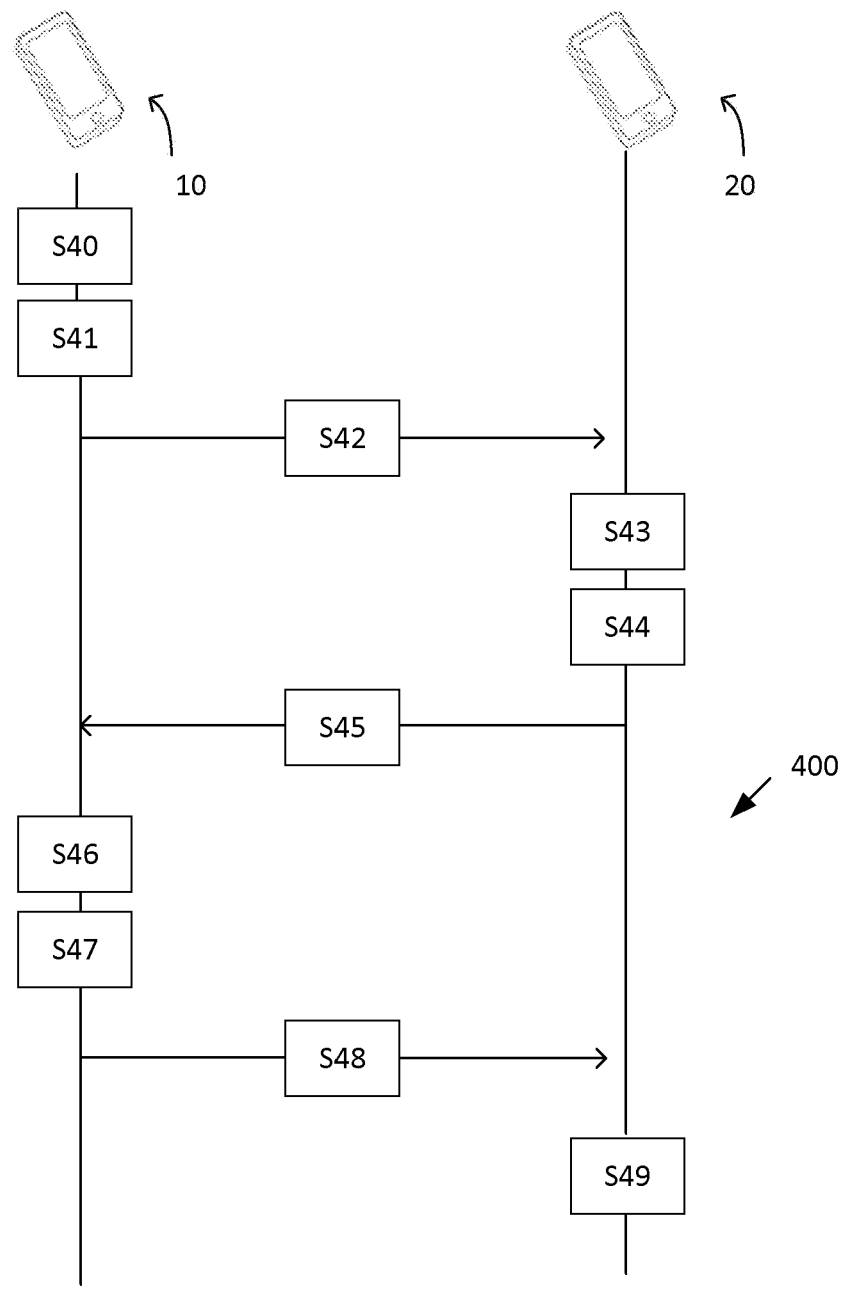
FIG. 4 is a schematic sequence diagram of a process by which a first UE and a second UE may update a security configuration for direct sidelink communication, according to a first example aspect herein.
Figure 5:
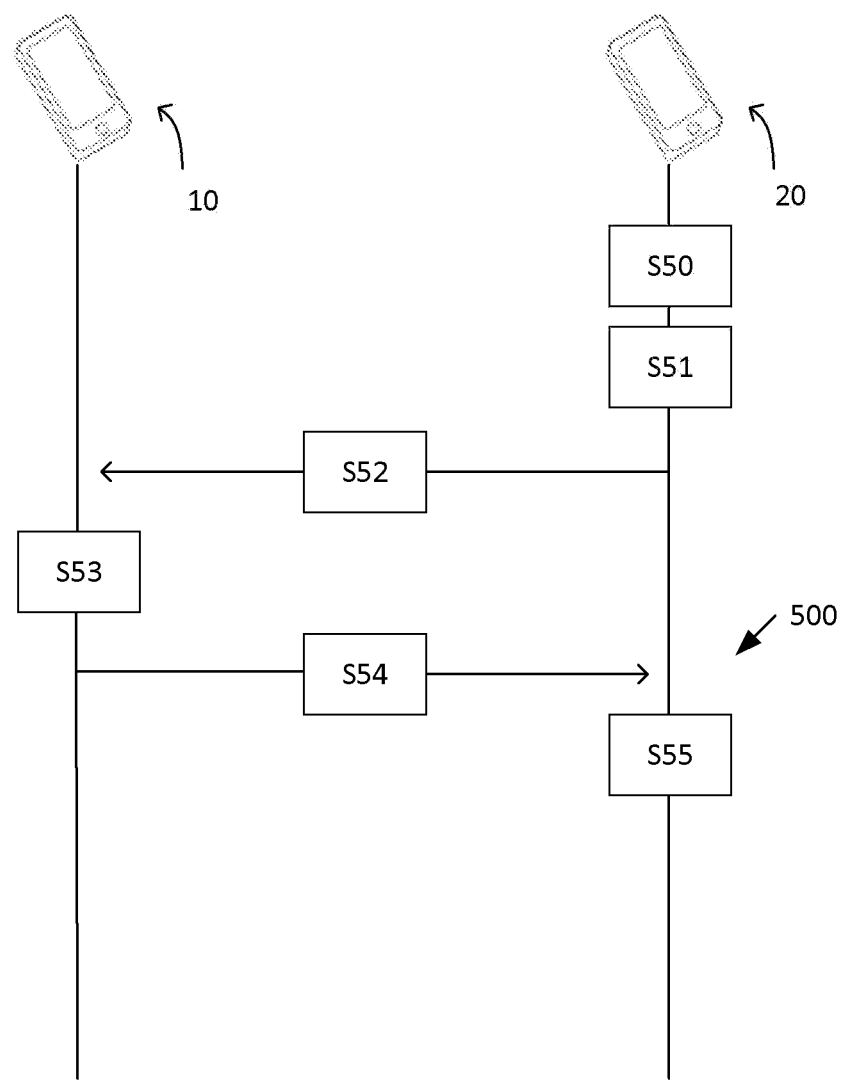
FIG. 5 is a schematic sequence diagram of a process by which a first UE and a second UE may update a security configuration for direct sidelink communication, according to a second example aspect herein.
Figure 6:
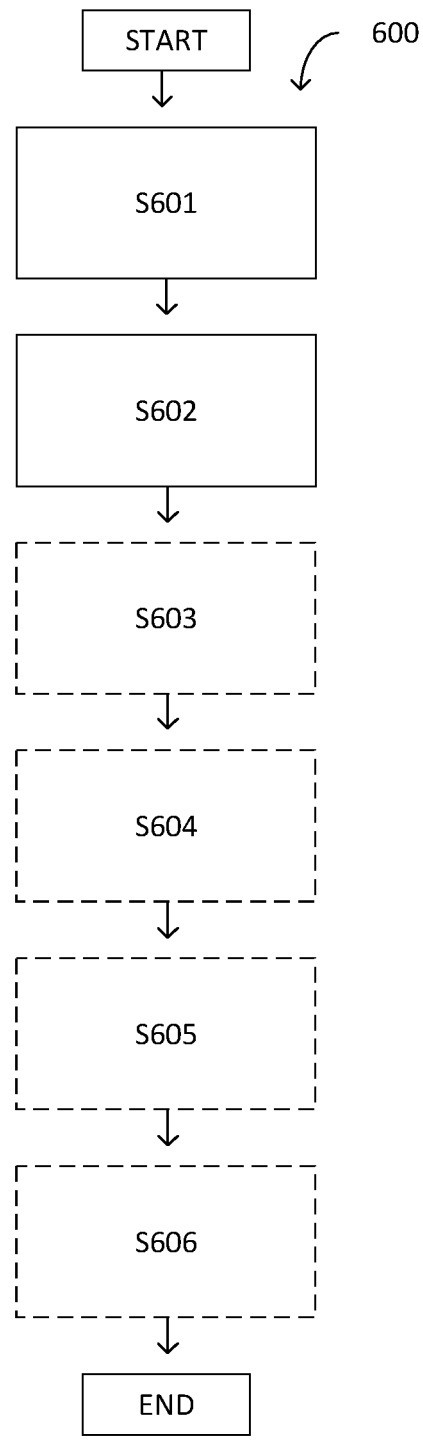
FIG. 6 is a flow diagram illustrating a process by which a first UE, that performs direct sidelink communication with a second user equipment, may re-establish a PDCP entity.

Specific examples of how the process steps of FIGS. 3A, 3B and 3C may be combined are described in relation to FIGS. 4, 5 and 6.

FIG. 4 is a schematic sequence diagram of a process 400 by which a first UE and a second UE may update a security configuration for direct sidelink communication, according to a first example aspect herein. Process 400 of FIG. 4 is triggered or initiated by an internal indication at the first UE.

The process 400 is described herein such that the UE 10 of FIG. 2 serves as the first UE and the UE 20 of FIG. 2 serves as the second UE. Alternatively, the UE 20 may serve as the first UE and the UE 10 may serve as the second UE.

In process step S40 of FIG. 4, the first UE 10 receives a first indication comprising sidelink signalling. The first indication comprises an internal indication from an upper layer. That is, receiving the first indication by the first UE 10 may comprise reception by one layer in the protocol stack from another higher layer in the protocol stack.

The first indication may, for example, comprise sidelink signalling in that the first indication is configured to effect or initiate sidelink communication by a lower layer. For example, the first indication may comprise an internal indication configured to effect or initiate transmission of PC5-S signaling, e.g., a DIRECT_REKEYING_REQUEST, a DIRECT SECURITY MODE COMMAND. That is, the first indication may comprise an upper layer internal indication configured to effect or initiate transmission of PC5-S signaling by a lower layer.

In process step S41 of FIG. 4, the first UE 10 suspends at least one data transmission/reception procedure in response to receiving the first indication. Process step S41 of FIG. 4 corresponds to process step S322 of FIG. 3B and, as such, the above description of process step S322 of FIG. 3B applies equally to process step S41 of FIG. 4.

In process step S42 of FIG. 4, the first UE 10 transmits a second indication to the UE 20. The transmitting/receiving section 120 of the first UE 10 may, as in the present example, be configured to transmit the second indication to the second UE 20.

By way of example, the second indication may comprise information indicating that the configuration for performing a transmission/reception procedure of the first UE 10 and/or the key is being or is to be updated, information configured to initiate a rekeying procedure, and/or other information relating to a rekeying procedure. For example, the second indication may comprise at least one of the following:

PC5-S signaling, e.g., DIRECT_REKEYING_REQUEST, DIRECT SECURITY MODE COMMAND;
PC5-RRC signaling, e.g., RRCReconfigurationSidelink;
User plane indication, e.g., control PDU of SDAP, PDCP, or RLC, or MAC CE.

In process step S43 of FIG. 4 of FIG. 4, in response to receiving the second indication from the first UE 10, the second UE 20 updates a configuration for performing a transmission/reception procedure of the second UE 20 in order to update a key based on the updated configuration for performing a transmission/reception procedure. Process step S43 of FIG. 4 corresponds to process step S302 of FIG. 3A and, as such, the above description of process step S302 of FIG. 3A applies equally to process step S43 of FIG. 4.

In process step S44 of FIG. 4, the second UE 20 suspends at least one data transmission/reception procedure. Process step S44 of FIG. 4 corresponds to process step S322 of FIG. 3B and, as such, the above description of process step S322 of FIG. 3B applies equally to process step S44 of FIG. 4.

In process step S45 of FIG. 4, the second UE 20 transmits a third indication to the first UE 10. The transmitting/receiving section 220 of the second UE 20 may, as in the present example, be configured to transmit the third indication to the first UE 10.

By way of example, the second indication may comprise information indicating that the configuration for performing a transmission/reception procedure of the second UE 20 and/or the key has been updated, and/or other information relating to a rekeying procedure. For example, the second indication may comprise at least one of the following:

PC5-S signaling, e.g., DIRECT SECURITY MODE COMMAND, DIRECT_SECURITY_MODE_COMPLETE DIRECT_REKEYING_RESPONSE;

PC5-RRC signaling, e.g., RRCReconfigurationSidelink, RRCReconfigurationCompleteSidelink;

User plane indication, e.g., control PDU of SDAP, PDCP, or RLC, or MAC CE.

In process step S46 of FIG. 4, in response to receiving the third indication, the first UE 10 updates a configuration for performing a transmission/reception procedure of the UE 10 in order to update a key based on the updated configuration for performing a transmission/reception procedure. Process step S46 of FIG. 4 corresponds to process step S302 of FIG. 3A and, as such, the above description of process step S302 of FIG. 3A applies equally to process step S46 of FIG. 4.

In process step S47 of FIG. 4, the first UE 10 resumes the at least one data transmission/reception procedure. Process step S47 of FIG. 4 corresponds to process step S332 of FIG. 3C and, as such, the above description of process step S332 of FIG. 3C applies equally to process step S47 of FIG. 4.

In process step S48 of FIG. 4, the first UE 10 transmits a fourth indication to the second UE 20. The transmitting/receiving section 120 of UE 10 may, as in the present example, be configured to transmit the fourth indication to the second UE 20.

By way of example, the fourth indication may comprise information indicating that the at least one data transmission/reception procedure has been resumed, and/or other information relating to a rekeying procedure. For example, the second indication may comprise at least one of the following:

PC5-S signaling, e.g., DIRECT_SECURITY_MODE_COMPLETE DIRECT_REKEYING_RESPONSE;

PC5-RRC signaling, e.g., RRCReconfigurationSidelink, RRCReconfigurationCompleteSidelink;

User plane indication, e.g., control PDU of SDAP, PDCP, or RLC, or MAC CE.

In process step S49 of FIG. 4, the second UE 20, in response to receiving the fourth indication from the first UE 10, resumes the at least one data transmission/reception procedure. Process step S49 of FIG. 4 corresponds to process step S332 of FIG. 3C and, as such, the above description of process step S332 of FIG. 3C applies equally to process step S49 of FIG. 4.

According to process 400 of FIG. 4, the first UE 10 suspends the at least one data transmission/reception procedure prior to transmitting the second indication to the second UE 20 and prior to updating its own key. In this way, it may be advantageously ensured that the at least one data transmission/reception procedure is suspended while the first UE updates its key and avoided that data is transmitted to or received from the second UE while the second UE updates the key at its end or performs any other activity related to a rekeying procedure in response to receiving the second indication. In this way, misalignment between the two UEs for the key being used for transmission and reception whereby the first UE 10 transmits a message using a first key and the second UE 20 attempts to receive said message using a different key may be reduced or avoided.

Furthermore, according to process 400 of FIG. 4, the second UE 20 suspends the at least one data transmission/reception procedure subsequently to updating its own key. In this way, it may be advantageously ensured that, once the key is updated, the at least one data transmission/reception procedure is suspended until a corresponding update of the key takes place in the first UE 10. In this way, misalignment between the two UEs for the key being used for transmission and reception whereby the first UE 10 transmits a message using a first key and the second UE 20 attempts to receive said message using a different key may be reduced or avoided.

In addition, according to process 400 of FIG. 4, the first UE 10 updates its key in response to receiving the third indication from the second UE 20. In this way, it may be advantageously ensured that the key of the first UE 10 is only updated after it is confirmed that the second UE 20 has successfully updated its key. As such, misalignment between the two UEs for the key being used for transmission and reception whereby the first UE 10 transmits a message using a first key and the second UE 20 attempts to receive said message using a different key may be reduced or avoided.

Furthermore, according to process 400 of FIG. 4, the first UE 10 resumes the at least one data transmission/reception procedure subsequently to updating its key. In this way, it may be advantageously ensured that the at least one data transmission/reception procedure is only resumed after the key has been successfully updated.

Still further, according to process 400 of FIG. 4, the second UE 20 resumes the at least one data transmission/reception procedure in response to receiving the fourth indication. As such, it may be advantageously ensured that the at least one data transmission/reception procedure is only resumed after it is confirmed that the first UE 10 has successfully updated its key. In this way, misalignment between the two UEs for the key being used for transmission and reception whereby the first UE 10 transmits a message using a first key and the second UE 20 attempts to receive said message using a different key may be reduced or avoided.

Accordingly, process 400 of FIG. 4 may serve to avoid failure to correctly receive the message, thereby reducing or avoiding a reduction in throughput in unicast SL communication.

FIG. 5 is a schematic sequence diagram of a process 500 by which a first UE and a second UE may update a security configuration for direct sidelink communication, according to a second example aspect herein. Process 500 of FIG. 5 is triggered or initiated by reception of signalling at the first UE. Process 500 of FIG. 5 may be triggered or initiated by an internal indication at the second UE or by any other suitable means.

The process 500 is described herein such that the UE 10 of FIG. 2 serves as the first UE and the UE 20 of FIG. 2 serves as the second UE. Alternatively, the UE 20 may serve as the first UE and the UE 10 may serve as the second UE.

In process step S50 of FIG. 5, the second UE 20 updates a configuration for performing a transmission/reception procedure of the second UE 20 in order to update a key based on the updated configuration for performing a transmission/reception procedure. Process step S50 of FIG. 5 corresponds to process step S302 of FIG. 3A and, as such, the above description of process step S302 of FIG. 3A applies equally to process step S50 of FIG. 5.

In process step S51 of FIG. 5, the second UE 20 suspends at least one data transmission/reception procedure. Process step S51 of FIG. 5 corresponds to process step S322 of FIG. 3B and, as such, the above description of process step S322 of FIG. 3B applies equally to process step S51 of FIG. 5.

In process step S52 of FIG. 5, the second UE 20 transmits a first indication to the first UE 10. The transmitting/receiving section 220 of the second UE 20 may, as in the present example, be configured to transmit the first indication to the first UE 10.

By way of example, the first indication may comprise information indicating that the configuration for performing a transmission/reception procedure of the second UE 20 and/or the key has been updated, information configured to initiate a rekeying procedure, and/or other information relating to a rekeying procedure. For example, the second indication may comprise at least one of the following:

PC5-S signaling, e.g., DIRECT_REKEYING_REQUEST, DIRECT SECURITY MODE COMMAND;
PC5-RRC signaling, e.g., RRCReconfigurationSidelink;
User plane indication, e.g., control PDU of SDAP, PDCP, or RLC, or MAC CE.

In process step S53 of FIG. 5, in response to receiving the first indication, the first UE 10 updates a configuration for performing a transmission/reception procedure of the UE 10 in order to update a key based on the updated configuration for performing a transmission/reception procedure. Process step S53 of FIG. 5 corresponds to process step S302 of FIG. 3A and, as such, the above description of process step S302 of FIG. 3A applies equally to process step S53 of FIG. 5.

In process step S54 of FIG. 5, the first UE 10 transmits a second indication to the second UE 20. The transmitting/receiving section 120 of the first UE 10 may, as in the present example, be configured to transmit the second indication to the second UE 20.

By way of example, the second indication may comprise information indicating that the configuration for performing a transmission/reception procedure of the first UE 10 and/or the key has been updated, and/or other information relating to a rekeying procedure. For example, the second indication may comprise at least one of the following:

PC5-S signaling, e.g., DIRECT SECURITY MODE COMMAND, DIRECT_SECURITY_MODE_COMPLETE DIRECT_REKEYING_RESPONSE;
PC5-RRC signaling, e.g., RRCReconfigurationSidelink, RRCReconfigurationCompleteSidelink;
User plane indication, e.g., control PDU of SDAP, PDCP, or RLC, or MAC CE.

In process step S55 of FIG. 5, the second UE 20, in response to receiving the second indication from the first UE 10, resumes the at least one data transmission/reception procedure. Process step S55 of FIG. 5 corresponds to process step S332 of FIG. 3C and, as such, the above description of process step S332 of FIG. 3C applies equally to process step S55 of FIG. 5.

According to process 500 of FIG. 5, the second UE 20 suspends the at least one data transmission/reception procedure subsequently to updating its own key. In this way, it may be advantageously ensured that, once the key is updated, the at least one data transmission/reception procedure is suspended until a corresponding update of the key takes place in the first UE 10. In this way, misalignment between the two UEs for the key being used for transmission and reception whereby the first UE 10 transmits a message using a first key and the second UE 20 attempts to receive said message using a different key may be reduced or avoided.

In addition, according to process 500 of FIG. 5, the first UE 10 updates its key in response to receiving the first indication from the second UE 20. In this way, it may be advantageously ensured that the key of the first UE 10 is only updated after it is confirmed that the second UE 20 has successfully updated its key. As such, misalignment between the two UEs for the key being used for transmission and reception whereby the first UE 10 transmits a message using a first key and the second UE 20 attempts to receive said message using a different key may be reduced or avoided.

Furthermore, according to process 500 of FIG. 5, the second UE 20 resumes the at least one data transmission/reception procedure in response to receiving the second indication. As such, it may be advantageously ensured that the at least one data transmission/reception procedure is only resumed after it is confirmed that the first UE 10 has successfully updated its key. In this way, misalignment between the two UEs for the key being used for transmission and reception whereby the first UE 10 transmits a message using a first key and the second UE 20 attempts to receive said message using a different key may be reduced or avoided.

Accordingly, process 500 of FIG. 5 may serve to avoid failure to correctly receive the message, thereby reducing or avoiding a reduction in throughput in unicast SL communication.

FIG. 6 is a flow diagram illustrating a process 600 by which a first UE 10, that performs direct sidelink communication with a second user equipment 20, may re-establish a PDCP entity.

The process 600 is described herein such that the UE 10 of FIG. 2 serves as the first UE and the UE 20 of FIG. 2 serves as the second UE. Alternatively, the UE 20 may serve as the first UE and the UE 10 may serve as the second UE.

In process step S601 of FIG. 6, the first UE 10 receives a first indication comprising sidling signalling from the second UE 20, the first indication being a PDCP user plane indication in the form of a PDCP entity re-establishment request.

By way of example, the transmitting/receiving section 120 of the first UE 10 may be configured to receive the PDCP entity re-establishment request from the second UE 20.

In process step S602 of FIG. 6, the first UE 10 performs PDCP re-establishment of a PDCP entity (i.e. PDCP re-establishment).

For example, the UE 10 may perform PDCP re-establishment of a PDCP entity of the SL via which the first indication was received from the second UE 20 (e.g a PDCP entity of the PC5 interface). Additionally or alternatively, performing PDCP re-establishment of the PDCP entity may, by way of example, comprise at least one of using a new key, receiving a new key from an upper layer, resetting a compression protocol (e.g. RObust Header Compression ROHC protocol) and resetting a value of one or more variables.

The process 600 of FIG. 6 may optionally further include process step S603. In process step S603, the UE 10 receives a first direct security mode command, after performing PDCP re-establishment of the PDCP entity.

By way of example, the first direct security mode command of a first type (first type direct security mode command). Additionally or alternatively, the transmitting/receiving section 120 of the first UE 10 may be configured to receive the first direct security mode command.

Additionally or alternatively, the process 600 of FIG. 6 may optionally further include process step S604. In process step S604, the UE 10 sends and/or receives user plane and signalling after receiving the first direct security mode command.

Additionally or alternatively, the process 600 of FIG. 6 may optionally further include process step S605. In process step S605, the UE 10 sends a second direct security mode command, after receiving the first direct security mode command.

By way of example, the second direct security mode command may be of a second type different (second type direct security mode command) to the first type of the first direct security mode command. For example, the second direct security mode command may be a direct security mode complete command.

Additionally or alternatively, the process 600 of FIG. 6 may optionally further include process step S606. In process step S606, the UE 10 is configured to complete re-establishment of the PDCP entity when receiving a direct security mode command.

Figure 7:
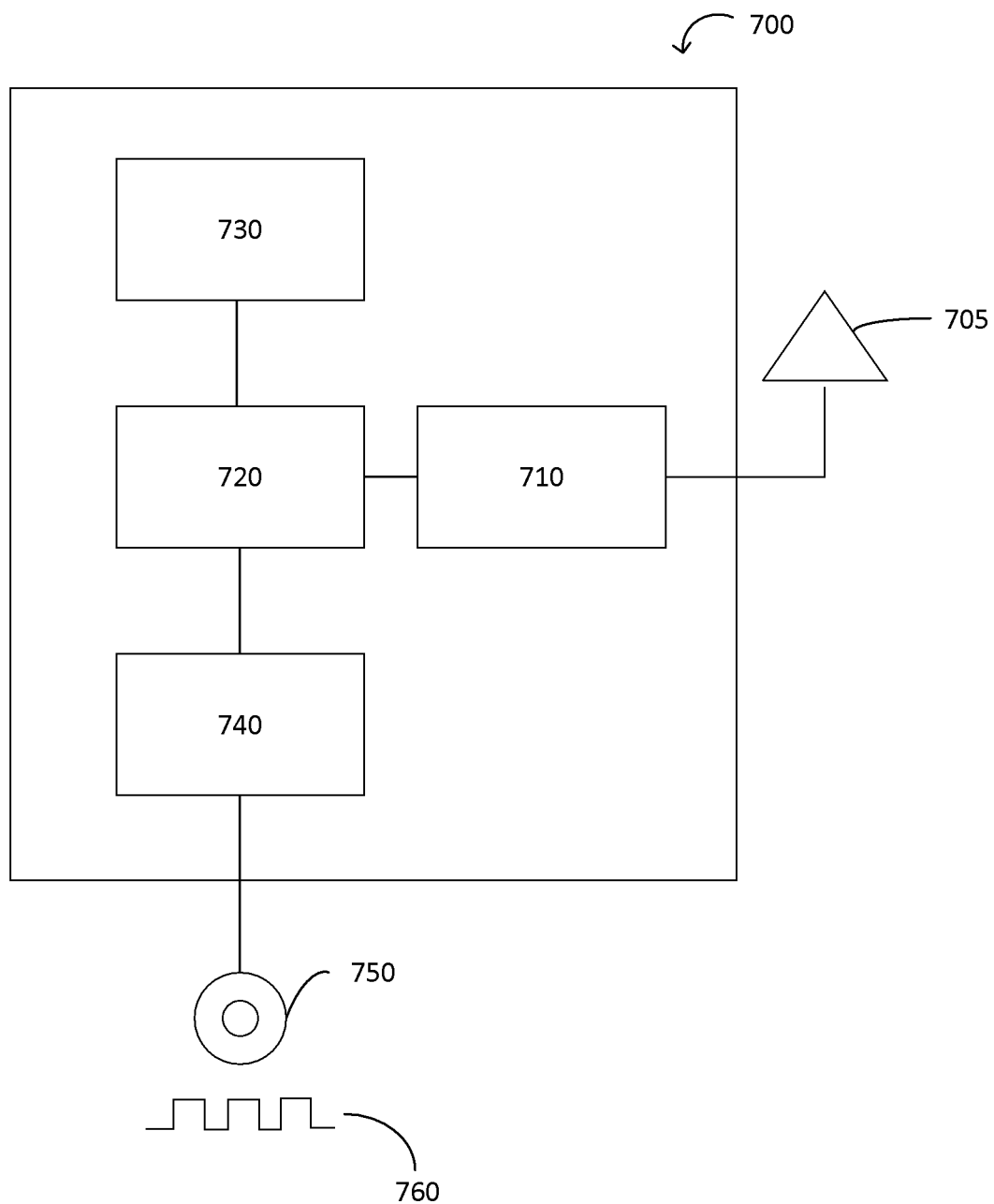
FIG. 7 is a block diagram illustrating an example signal processing hardware configuration of either of the UEs of FIG. 2, according to an example aspect herein.

FIG. 7 is a block diagram illustrating an example signal processing hardware configuration 700 of either of UEs 10, 20 of FIG. 2, according to an example embodiment herein. The programmable signal processing hardware 700 of FIG. 7 may, as in the present example embodiment, be configured to function as either of UEs 10, 20 of FIG. 2.

It should be noted, however, that one or both of the UEs 10, 20 of FIG. 2 may alternatively be implemented in non-programmable hardware, such as an application-specific integrated circuit (ASIC) or in any other suitable manner, using any suitable combination of hardware and software components, such that the UE 100 comprises processing and communication functionalities necessary to operate in accordance with one or more conventional telecommunication standards, including—but not limited to—LTE, LTE-A, UMTS, 3G, 4G, 5G.

The programmable signal processing hardware 700 comprises a transmitting/receiving section 710 and one or more antennae 705. The signal processing apparatus 700 further comprises a control section (by way of example, a processor, such as a Central Processing Unit, CPU, or Graphics Processing Unit, GPU) 720, a working memory 730 (e.g. a random access memory) and an instruction store 740 storing the computer-readable instructions which, when executed by the control section 720, cause the control section 720 to perform the functions of either of UEs 10, 20 of FIG. 2.

The instruction store 740 may comprise a ROM (e.g. in the form of an electrically-erasable programmable read-only memory (EEPROM) or flash memory) which is pre-loaded with the computer-readable instructions. Alternatively, the instruction store 740 may comprise a RAM or similar type of memory, and the computer-readable instructions of the computer program can be input thereto from a computer program product, such as a non-transitory, computer-readable storage medium 750 in the form of a CD-ROM, DVD-ROM, etc. or a computer-readable signal 760 carrying the computer-readable instructions.

Figure 8:
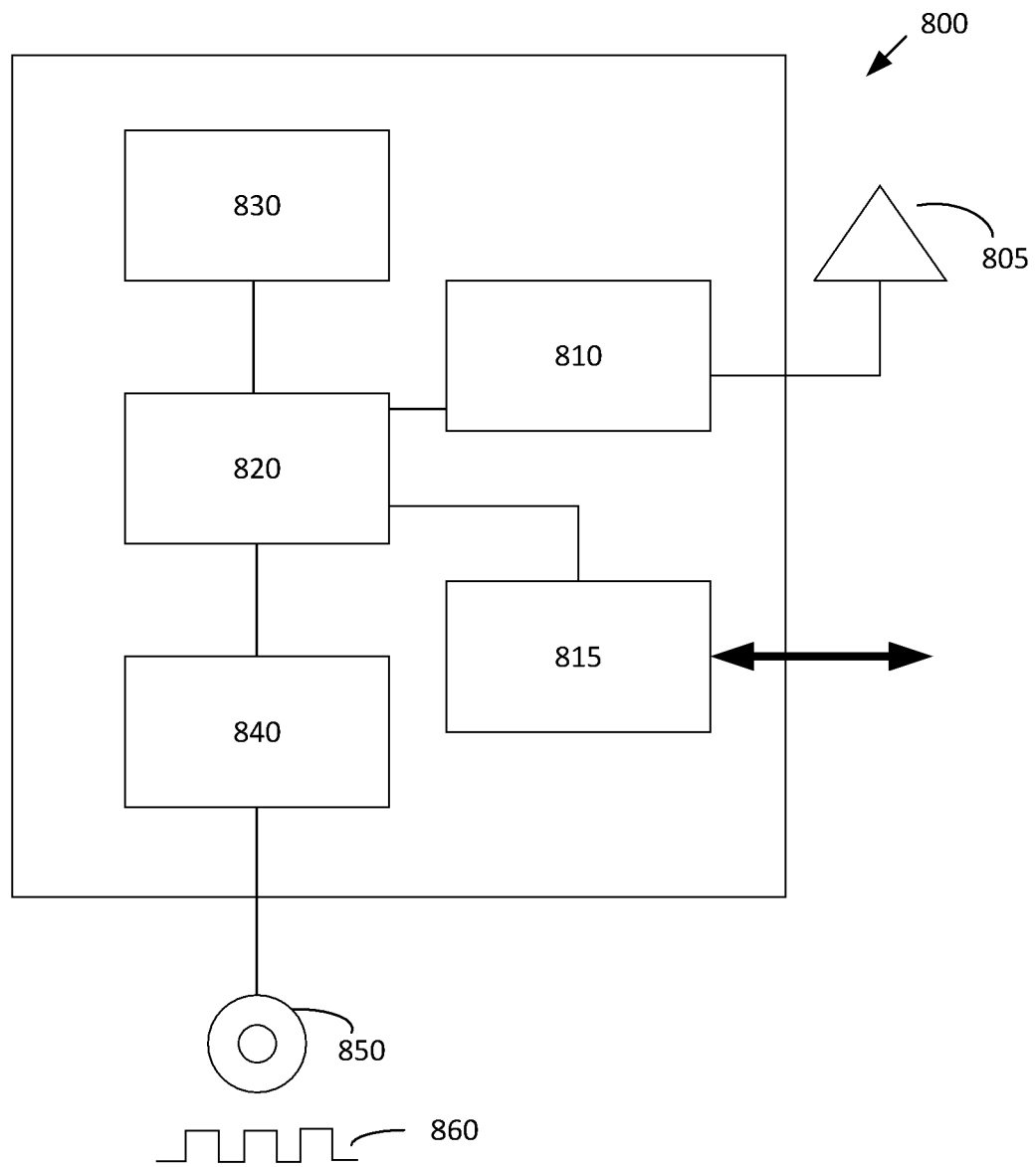
FIG. 8 is a block diagram illustrating an example signal processing hardware configuration of the radio base station of FIG. 2, according to an example aspect herein.

FIG. 8 is a block diagram illustrating an example signal processing hardware configuration 800 of the radio base station 30 of FIG. 2, according to an example embodiment herein. The programmable signal processing hardware 800 of FIG. 2 may, as in the present example embodiment, be configured to function as radio base station 30 of FIG. 2. It should be noted, however, that the radio base station 30 may alternatively be implemented in non-programmable hardware, such as an application-specific integrated circuit (ASIC) or in any other suitable manner, using any suitable combination of hardware and software components, such that the radio base station 30 comprises processing and communication functionalities necessary to operate in accordance with one or more conventional telecommunication standards, including—but not limited to—LTE, LTE-A, UMTS, 3G, 4G, 5G.

The programmable signal processing hardware 800 comprises a transmitting/receiving section 810 and one or more antennae 805. The signal processing apparatus 800 further comprises a network communication interface 815, a control section (by way of example, a processor, such as a Central Processing Unit, CPU, or Graphics Processing Unit, GPU) 820, a working memory 830 (e.g. a random access memory) and an instruction store 840 storing the computer-readable instructions which, when executed by the control section 820, cause the processor 820 to perform the functions of the radio base station 30 of FIG. 2.

The instruction store 840 may comprise a ROM (e.g. in the form of an electrically-erasable programmable read-only memory (EEPROM) or flash memory) which is pre-loaded with the computer-readable instructions. Alternatively, the instruction store 840 may comprise a RAM or similar type of memory, and the computer-readable instructions of the computer program can be input thereto from a computer program product, such as a non-transitory, computer-readable storage medium 850 in the form of a CD-ROM, DVD-ROM, etc. or a computer-readable signal 860 carrying the computer-readable instructions.

Although detailed embodiments have been described, they only serve to provide a better understanding of the invention defined by the independent claims, and are not to be seen as limiting.

The invention claimed is:

1. A method of a first user equipment, UE, that performs direct sidelink communication with a second UE, the method comprising:
   receiving, via a PC5 interface, a first indication from the second UE, wherein the first indication comprises a sidelink signalling, wherein the sidelink signalling comprises at least one of a PC-5 signalling, a PC5-RRC (radio resource control) signalling, and a user plane indication;
   in response to receiving the first indication, suspending at least one data transmission/reception procedure;
   transmitting, prior to updating a configuration for performing a transmission/reception procedure, a second indication to the second UE via the PC5 interface, wherein the configuration is a security configuration for the direct sidelink communication;
   receiving, from the second UE, a third indication via the PC5 interface;
   updating the configuration for performing the transmission/reception procedure of the first UE in response to receiving the third indication and updating a key based on the updated configuration for performing the transmission/reception procedure in response to receiving the third indication;
   in response to updating the configuration, resuming the at least one data transmission/reception procedure; and
   in response to resuming the at least one data transmission/reception procedure, transmitting a fourth indication to the second UE via the PC5 interface.

2. A first user equipment, UE, configured to perform direct sidelink, SL, communication with a second UE, the first UE comprising:
   a control section;
   a transmitting/receiving section; and
   a memory,
   wherein:
   the first UE is configured to perform:
      receiving, via a PC5 interface, a first indication from the second UE, wherein the first indication comprises a sidelink signalling, wherein the sidelink signalling comprises at least one of a PC-5 signalling, a PC5-RRC (radio resource control) signalling, and a user plane indication;

in response to receiving the first indication, suspending (S41) at least one data transmission/reception procedure;

transmitting, prior to updating a configuration for performing a transmission/reception procedure, a second indication to the second UE via the PC5 interface, wherein the configuration is a security configuration for the direct sidelink communication;

receiving, from the second UE, a third indication via the PC5 interface;

updating the configuration for performing the transmission/reception procedure of the first UE in response to receiving the third indication and updating the key based on the updated configuration for performing the transmission/reception procedure in response to receiving the third indication;

in response to updating the configuration, resuming the at least one data transmission/reception procedure; and in response to resuming the at least one data transmission/reception procedure, transmitting a fourth indication to the second UE via the PC5 interface.

3. A method of a second user equipment, UE, that performs direct sidelink communication with a first UE, the method comprising:

updating a configuration for performing a transmission/reception procedure of the second UE in order to update a key based on the updated configuration for performing the transmission/reception procedure and updating the key based on the updated configuration for performing the transmission/reception procedure, wherein the configuration is a security configuration for the direct sidelink communication;

suspending at least one data transmission/reception procedure;

transmitting, via a PC5 interface, a first indication to the first UE, wherein the first indication comprises a sidelink signalling to the first UE, wherein the sidelink signalling comprises at least one of a PC-5 signalling, a PC5-RRC (radio resource control) signalling, and a user plane indication, wherein the first indication controls the first UE to update the configuration for performing the transmission/reception procedure of the first UE in order to update the key based on the updated configuration for performing the transmission/reception procedure;

receiving a second indication from the first UE via the PC5 interface;

in response to receiving the second indication from the first UE, resuming the at least one data transmission/reception procedure.

* * * * *